United States Patent

Lawson

[15] 3,648,034
[45] Mar. 7, 1972

[54] NAVIGATIONAL APPARATUS

[72] Inventor: Graham John Lawson, Aldershot, England

[73] Assignee: Minister of Technology in Her Britannic Majesty's Government of the United Kingdom of Great Britain and Northern Ireland

[22] Filed: Nov. 21, 1969

[21] Appl. No.: 878,848

[52] U.S. Cl. .................. 235/150.26, 235/150 P, 235/150.272
[51] Int. Cl. ........................................................ G06f 15/50
[58] Field of Search .................. 235/150.26, 150.272, 150 P, 235/150.27

[56] References Cited

UNITED STATES PATENTS

3,536,901 10/1970 Pearson ........................... 235/150.272
3,226,719 12/1965 Chown ........................... 235/150.272 X

*Primary Examiner*—Malcolm A. Morrison
*Assistant Examiner*—Edward J. Wise
*Attorney*—Hall, Pollock & Vande Sande

[57] ABSTRACT

Navigational apparatus for use in a mobile craft comprises measuring means for providing electrical representations of two coordinates of the two position of the mobile craft relative to a hyperbolic navigation system, a data store for holding representations of sets of constants, selection means for selecting one of the sets, and a computer for calculating given functions of the measured coordinates and the selected constants to produce useful approximate indications of the latitude and longitude of the mobile craft. The functions may be a pair of polynomials of the second degree, each having five constants, so that there will be 10 constants in each set.

10 Claims, 4 Drawing Figures

Graham John Lawson
*Inventor*

By Hall, Pollock & Vande Sande
*Attorneys*

FIG. 4.

NAVIGATIONAL APPARATUS

The present invention relates to navigational apparatus for use in a mobile craft to determine the location of the mobile craft in conjunction with a hyperbolic radio-location system.

Hyperbolic radio-location systems are now very well known. In these systems measurements of the phase differences between radio signals, received on the mobile craft from pairs of synchronized transmitters at separate known geographical locations, are used to determine the position of the mobile craft in relation to families of substantially hyperbolic curves. However, the parameters of the curves of the system which pass through the position of the mobile craft, which are obtained from the phase difference measurements, are inconvenient for use as navigational coordinates. It is therefore generally considered necessary to derive latitude and longitude coordinates by calculation or conversion from the measurements of the hyperbolic radio-location system. In an extensive system, the oblate spheroidal shape of the earth's surface and effects relating to the propagation of the radio signals around the earth between the earth and the ionosphere affect the positions and shape of the curves of the system, and must be taken into account in the conversion to latitude and longitude, if accurate location measurements are to be achieved. The conversion process is therefore complicated, and for instance may require a computer program of some eight hundred instructions to be followed for each location calculated. It is desirable for the conversion process to be carried out on board the mobile craft, but the expense and complexity of the installation required to make convenient and accurate measurements available are considerable disadvantages tending to restrict the application of the system.

It is an object of the present invention to provide comparatively simple and inexpensive apparatus for deriving latitude and longitude coordinates from the measurements of a hyperbolic navigation system, which may be suitable for use in a mobile craft and may provide latitude and longitude indications after a comparatively short computation time.

According to the present invention, there is provided navigational apparatus including:

measuring means for providing electrical representations of at least two coordinates Wxy and Wpq representing the position of the measuring means in a hyperbolic navigation system, data storage means for storing representations of sets of previously calculated numerical constants, each particular set being applicable to positions within an associated region within the range of the hyperbolic navigation system so that two predetermined mathematical functions $\theta$, $\phi$ of the coordinates Wxy, Wpq and the constants of the set will have numerical values approximately equal to the latitude and the longitude respectively of the position represented by the coordinates Wxy, Wpq provided that this position lies within the region associated with the set of constants used, selection means for selecting from the data storage means the representations of a set of constants $(a_1 \ldots a_n, b_1 \ldots b_n)$ applicable to a region embracing the position of the measuring means, and computing means responsive to the representations of Wxy, Wpg provided by the measuring means and responsive to the representations of the constants $a_1 \ldots a_n, b_1 \ldots b_n$ selected from the data storage means for computing the numerical values of the functions $\theta(a_1 \ldots a_n, Wxy, Wpq)$ and $\phi(b_1 \ldots b_n, Wxy, Wpq)$.

For operational use, relevant sets of numerical constants, previously calculated by a larger fixed computer, would be stored in the data storage means. The mathematical functions $\theta$, $\phi$ may involve polynomials, of the second degree relative to the coordinates Wxy, Wpq but linear with respect to the constants $a_1 \ldots a_n, b_1 \ldots b_n$. In order to reduce the magnitude of the numbers involved in the calculation, it is desirable to express the latitude, longitude and hyperbolic coordinates of each position in terms of increments with respect to the latitude, longitude and hyperbolic coordinates respectively of a reference point arbitrarily chosen in or near the center of the region. For instance it is convenient to put $$\theta = o + a_1(Dxy) + a_2(Dpq) + a_3(Dxy)(Dpq) + a_4(Dxy)^2 + a_5(Dpq)^2 \quad (1)$$

and $$\phi = \phi o + b_1(Dxy) + b_2(Dqp) + b_3(Dxy)(Dpq) + b_4(Dxy)^2 + b_5(Dpq)^2 \quad (2)$$

where Dxy and Dpq are increments of the system coordinates Wxy and Wpq, defined by $$Dxy = Wxy - Wxyo \quad \text{(equation 3)}$$

$$Dpq = Wpq - Wpqo \quad \text{(equation 4)}$$

where $\theta o$ and $\phi o$ are the latitude and longitude respectively of a chosen reference point, Wxy is a system coordinate obtained by measuring the phase difference between signals received from two separate fixed transmitters X and Y, Wpq is a system coordinate obtained by measuring the phase difference between signals received from a different pair of separate fixed transmitters P and Q, Wxyo and Wpqo are the values of Wxy and Wpq respectively which apply to the reference point, and $a_1, a_2, a_3, a_4, a_5, b_1, b_2, b_3, b_4,$ and $b_5$ form a set of constants.

The numerical value of the function $\theta$ will be an acceptable approximation to the latitude of a mobile craft in which the apparatus is installed, and the numerical value of the function $\phi$ will be an acceptable approximation to its longitude, if a given set of values of the constants $(a_1 \ldots a_5, b_1 \ldots b_5)$ appropriate to a region embracing the position of the craft, and the coordinates $(\theta o, \phi o, Wxyo$ and $Wpqo)$ of a reference point given for that region were used to calculate these values. Other available sets of values of the constants and reference point coordinates associated therewith will be appropriate to other regions. For each region the associated reference point is a given point, preferably centrally situated in its region. One of the transmitters X and Y may also be used as one transmitter of the pair P and Q. The approximations can be improved by adding constants $a_o, b_o$ to the right-hand sides of equations 1 and 2 respectively. However, in approximations of this form, $a_o$ and $b_o$ can be included as variations of $\theta_o$ and $\phi_o$ respectively.

The calculation of the functions $\theta$ and $\phi$ according to equations 1, 2, 3 and 4 for any given case can generally be done by a program of some 40 instructions, in a less elaborate computer apparatus than that required for an accurate conversion from the fundamental geodesic and propagational equations expressing the relationship between the system coordinates and latitude and longitude. Thus the use of approximate functions and stored sets of constants enables sufficiently accurate results to be obtained from a simpler installation in the mobile craft, which installation may therefore be less expensive, more reliable and easier to maintain than apparatus hitherto considered necessary for the same purpose. Since the computing program involved is much shorter, the invention allows each conversion to be completed more quickly and therefore provides more accurate measurements in any fast-moving craft. The shorter calculation used in the invention is also advantageous since it may allow more time for the computer means to be used on other tasks on a time-sharing basis.

To resolve ambiguities and to achieve more accurate measurements there will usually be provided apparatus for measuring at least three distinct system coordinates from signals received from at least three different pairs of transmitters. Each transmitter's signals may be used in several pairs; for instance the signals from three transmitters may be taken in three different pairs to derive three system co-ordinates. To ensure that accurate measurements will be possible in all places even if one transmitter or receiver signal channel is made unusable by any fault or radio interference, facilities should be provided for using the signals from four separate transmitters if required. Other functions similar to $\theta$ and $\phi$, but expressing the latitude and longitude respectively of locations in the same region in terms of different pairs of system coordinates and other sets of constants, may be defined, and arrangements for storing sets of values of the other sets of constants and for calculating the other functions will therefore also usually be provided.

In applications of the present invention, some part of the earth's surface will be notionally subdivided into regions having predetermined arbitrarily chosen boundaries. These boundaries will be defined with respect to coordinates of some known kind, for instance latitudes and longitudes, or coordinates in some known navigation system. The selection of the appropriate set of constants in any particular case will be achieved by comparing coordinates representing a recent measurement of the position of the measuring means with the coordinate limits which define the chosen boundaries until a region including that position is identified; the set of constants appropriate for that region are then selected and applied to the computer means. It is convenient to choose boundaries which can each be defined by a single coordinate value, for instance curves of constant latitude or constant longitude, or curves on which particular coordinates of a known navigation system have conveniently chosen constant values.

Embodiments of the invention will now be described, by way of example only, with reference to the accompanying drawings of which

Figure 1:
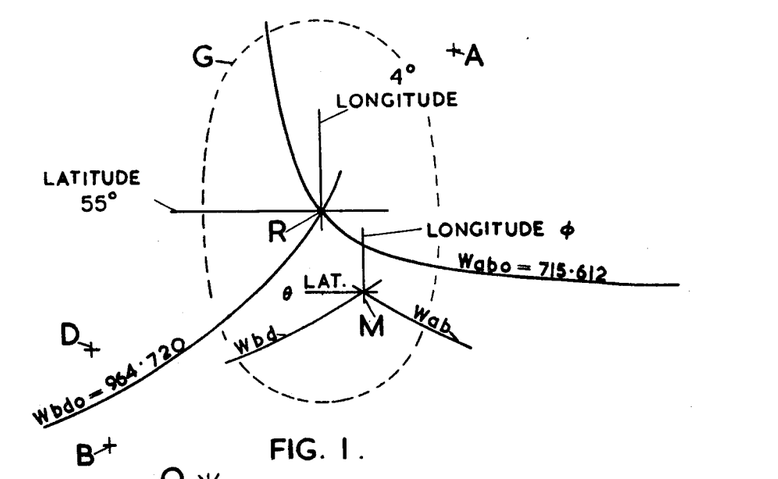
FIG. 1 is a diagrammatic map showing the transmitter stations of a hyperbolic navigation system, and illustrating an example of its use in conjunction with navigational apparatus which forms an embodiment of the invention and is installed in a mobile craft.

FIG. 1 is not drawn exactly or to any exact scale, but illustrates an application of the invention in conjunction with a hyperbolic navigation system known as OMEGA. The points A, B, and D represent three transmitters of the OMEGA system, situated respectively at Aldra, Norway; Trinidad; and Forestport, near New York USA. By international agreement, positions which are equidistant from two transmitters are regarded as having a system coordinate of 900 relative to those transmitters, and for other positions the system coordinate is made to differ from 900 by X units, where X is the number of cycles of phase difference between the signals received from the two transmitters at the position concerned.

A reference point R is situated at latitude 55° (North) and longitude −4° (the minus sign indicating a longitude west of the Greenwich meridian). This point R has a system coordinate $Wabo=715.612$ with respect to the transmitters A and B, and a system coordinate $Wbdo=964.720$ with respect to the transmitters B and D. The hyperbolic curves which are the loci of positions having system coordinates $Wabo$ and $Wbdo$ respectively are indicated on the drawing, intersecting at the point R.

The point M represents a position of a mobile craft, having OMEGA system coordinates $Wab$ and $Wbd$, latitude $\theta$ and longitude $\phi$. A region which embraces the whole of the British Isles is diagrammatically represented in FIG. 1 as the area enclosed by a broken line G. It has been calculated that for any position of the point M within this region, its latitude $\theta$ and longitude $\phi$ will be given approximately by $$\theta = 54.9976 - 0.0061474(Dab) - 0.3161023(Dbd) + 0.4024997(Dab)(Dbd) - 0.6046480(Dab)^2 - 0.0022102(Dbd)D2 \quad \text{(equation 5)}$$

and $$\phi = -3.9851 + 9.0039918(Dab) - 0.0003644(Dbd) + 0.0009409(Dab)(Dbd) - 0.0018389(Dab)^2 + 0.0035591(Dbd)^2 \quad \text{(equation 6)}$$

where $$Dab = Wab - 715.612 \quad \text{(equation 7)}$$

and $$Dbd = Wbd - 964.720 . \quad \text{(equation 8)}$$

The maximum error in these approximations is of the order of 2 miles or less, and they are sufficiently accurate for many practical purposes.

Figure 2:
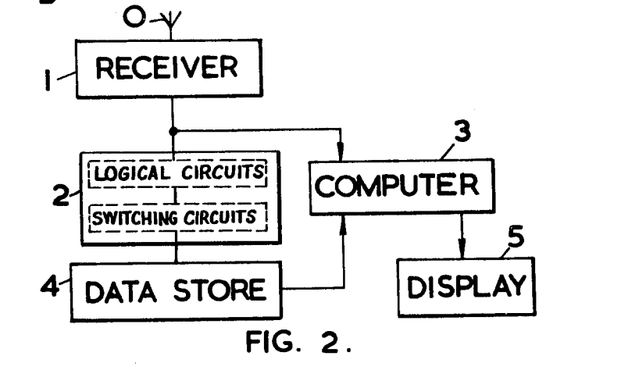
FIG. 2 is a schematic circuit diagram of the navigational apparatus.

FIG. 2 shows the general arrangement of the navigational apparatus. An OMEGA receiver 1 is connected to receive signals through an aerial O and to derive signals representing OMEGA system coordinates of the position of the apparatus. The outputs of the receiver are connected to a selector 2 and to a computer 3. The selector 2 controls connections of a data store 4, and outputs from the data store are connected to the computer 3. The computer is connected to operate a display 5 which indicates the position of the apparatus. The selector 2 may be an arrangement of logical circuits responsive to values of the OMEGA coordinate signals which correspond to arbitrarily chosen boundaries defining various regions over the earth's surface, connected to operate switching circuits to direct signals representing associated sets of constants (for instance, the set of the numerical constants involved in equations 5 to 8 inclusive) from the data store 4 into the computer 3. For instance, when the apparatus is in the region enclosed by the line G, the selector 2 will provide the computer 3 with the constants for equation 5 to 8 inclusive arranged in the following sequence.

| | |
|---|---|
| 54.9976 | $(=\theta_0 + a_0)$ |
| −3.9851 | $(=\phi_0 + b_0)$ |
| −0.0061474 | $(=a_1)$ |
| +0.0039918 | $(=b_1)$ |
| −0.3161023 | $(=a_2)$ |
| −0.003644 | $(=b_2)$ |
| +0.4024997 | $(=a_3)$ |
| +0.0009409 | $(=b_3)$ |
| −0.6046480 | $(=a_4)$ |
| −0.0018389 | $(=b_4)$ |
| −0.0022102 | $(=a_5)$ |
| +0.0035591 | $(=b_5)$ |
| 715.612 | $(=Wabo)$ |
| 964.720 | $(=Wbdo)$ |

The following program is written as initial orders for a Ferranti Argus computer:

```
~~115
7000        11~99
7030        *214~100
7100        *216~100
7000        13~99
7030        *215~100
7100        *217~100
1050        2
1060        1
7001        *203~100
7360        *216~100
7300        22
7000        2
7101        *221~100
7001        *205~100
7360        *217~100
7300        22
7000        2
7121        *221~100
7000        *216~100
7360        *217~100
7361        *207~100
7300        11
7000        2
7121        *221~100
7000        *216~100
7360        *216~100
7361        *211~100
7300        11
7000        2
7121        *221~100
7000        *217~100
7360        *217~100
7361        *213~100
7300        11
7000        2
7121        *221~100
7001        *201~100
7121        *221~100
1230        −31~
0270        *16~102
```

This program will cause the computer 3 to calculate values of $\theta$ and $\phi$ according to equations 1 to 4 inclusive using the constants provided.

Various modifications of the apparatus are possible. The computer 3 may have several sets of constants loaded into some of its data stores and may be programmed so that its logic circuits select the appropriate set of constants according to the values of the system coordinate inputs or according to latitude and longitude position inputs. In this arrangement, parts of the computer perform the functions of the data storage means and the selection means so that they are no longer required in the form of separate units.

Figure 4:
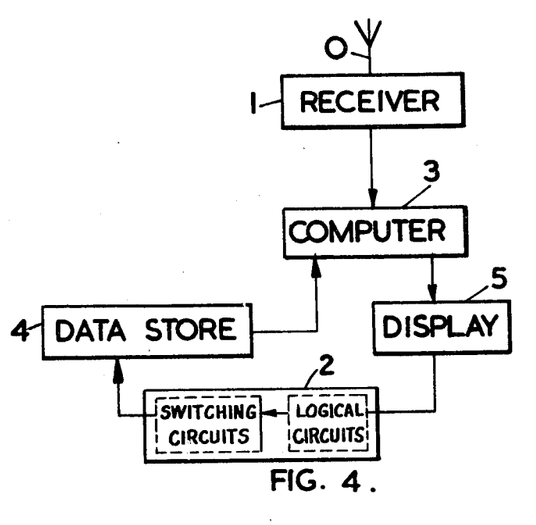

In many applications it is envisaged that the apparatus will always be put into operation at a known location (e.g., an airport) where the display 5 will be corrected and reset if necessary, and will be continuously operated throughout each journey, so that there will always be some recent latitude and longitude measurements available. The regional boundaries used may then be conveniently defined in terms of latitude and longitude, and the selector 2 may then comprise logical circuits, connected to respond to the latitude-indicating output and the longitude-indicating output of the computer 3 or the display 5, and switching circuits controlled by the logical circuits, for applying to the computer 3 signals from the data store 4 which represent a set of the constants applicable to a region including the location represented by the said latitude-indicating output and the said longitude-indicating output. This arrangement is shown in FIG. 4.

The regions within which a single set of constants gives an acceptable approximation can be quite large.

Figure 3:
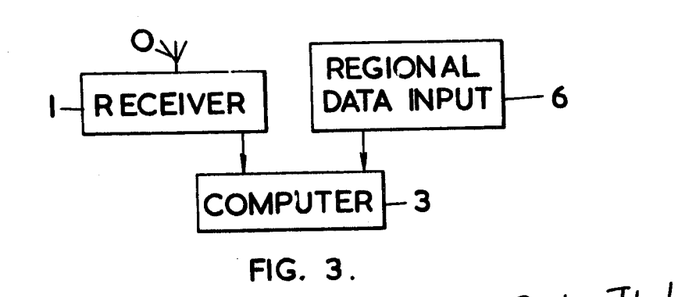
FIGS. 3 and 4 are schematic circuit diagrams of modified forms of the navigational apparatus.

In many cases, it is possible to find a single set of constants which will give satisfactory approximations through a region which embraces the whole of a medium-distance air route. For instance, one set of constants (for the equation 1 to 4 ) has been found acceptable over a flight path from Gander, Newfoundland to Farnborough, England, with a maximum error of the order of 2 miles. Hence it may not be necessary to change the set of constants in use en route, and an automatic selector is not absolutely necessary. It may be sufficient to provide means by which a navigator can select and apply an appropriate set of stored data to the computer. FOr instance the data store may comprise a set of cards, on which the data signals are stored as punched holes, black spots or magnetized spots, and the selection means may be provided in the form of a regional data input apparatus, for example a card-reader device in which an appropriate card is placed to transmit its data to the computer. The apparatus may therefore take the simpler form shown in FIG. 3, which shows the receiver 1 connected to the aerial 0 and the computer 3, and a regional data input apparatus 6 also connected to the computer 3. The regional data input apparatus 6 may be a tape-reader or card-reader device, or a fixed data store with manually operable selection switches.

The derivation of suitable sets of constants for use with a given form of approximation (e.g., equations 1 and 2 hereinabove) in given regions involves a considerable amount of computation, but can be achieved by basically simple procedures, for instance as follows:

First, a central reference point and a plurality of locations spaced apart in the region are arbitrarily chosen, including some points from the edges or corners of the region. The chosen locations, and the locations of the transmitters to be used in the system, are specified by their latitudes and longitudes. The hyperbolic navigation system coordinates for each of the chosen locations must now be calculated. To do this, the geodesic distances from each location to each transmitter must be calculated. This is a known geodesic problem, which can be solved by various known methods. The preferred methods, known as the Andoyer-Lambert method and Sodano's Fourth Method, have been conveniently republished in ACIC Technical Report No. 80 (Appendices G2 and G3) (1959) by the Aeronautical Chart and Information Center, St. Louis 18, Missouri, USA. By taking the calculated geodesic distances in pairs and taking their differences, the hyperbolic system coordinates for the reference point and each other chosen location can be found. This gives the information required using equations 3 and 4 to fill in columns 1 and 5 of a table with numerical entries as follows:

| 1 | 2 | 3 | 4 | 5 | 6 | 7 | 8 |
|---|---|---|---|---|---|---|---|
| | | | System coordinate increments | | Functions of the coordinate increments | | |
| Location | Latitude increment | Longitude increment | $D_{xy}$ | $D_{pq}$ | $D_{xy} \times D_{pq}$ | $D_{xy}^2$ | $D_{pq}^2$ |
| 1 | $\theta_1 - \theta_0$ | $\phi_1 - \phi_0$ | $X_{11}$ | $X_{12}$ | $X_{13}$ | $X_{14}$ | $X_{15}$ |
| 2 | $\theta_2 - \theta_0$ | $\phi_2 - \phi_0$ | $X_{21}$ | $X_{22}$ | $X_{23}$ | $X_{24}$ | $X_{25}$ |
| n | $\theta_n - \theta_0$ | $\phi_n - \phi_0$ | $X_{n1}$ | $X_{n2}$ | $X_{n3}$ | $X_{n4}$ | $X_{n5}$ |

In this table, the $\theta$, $\phi$ and $X$ entries are all number, and the columns 6, 7, and 8 can clearly be filled in by calculation from the entries in columns 4 and 5.

Now, a set of suitable constants should fit two sets of simultaneous equations, corresponding to equations (1) and (2) with the values from the rows of the table substituted in, within a tolerable error. For each chosen location there is one row of the table, and one equation for each set. Thus the set of equations involving the latitudes of the chosen locations is $$X_{11}a_1 + X_{12}a_2 + X_{13}a_3 + X_{14}a_4 + X_{15}a_5 + \theta_0 - \phi_1 = e_1 \quad \text{(equation 9)}$$

$$X_{21}a_1 + X_{22}a_2 + X_{23}a_3 + X_{24}a_4 + X_{25}a_5 + \theta_0 - \phi_2 = e_2$$

...

$$X_{n1}a_1 + X_{n2}a_2 + X_{n3}a_3 + X_{n4}a_4 + X_{n5}a_5 + \phi_0 - \phi_n = e_n$$

where $e_1, e_2 \ldots e_n$ represent errors at present unknown. The $X$'s and $\phi$'s are all known numerical values, and the problem is to fine values of $a_1$ to $a_5$ inclusive which will satisfy the above set of simultaneous equations with minimum values of the errors $e_1$ to $e_n$, or preferably minimizing the sum of of the squares of the errors $$Q = \sum_{j=1}^{n} (e_j)^2$$

This will be recognized by statisticians as a linear multivariate regression problem, and methods for solving such problems are described in works on statistics, for instance on pages 245–246 inclusive 296–318 inclusive of "Statistical Analysis in Chemistry and the Chemical Industry" by C. A. Bennett and N, L. Franklin (J. Wiley 1954) and in sections 28.12 to 28:14 of "Advanced Theory of Statistics" by Kendall and Stuart (Vol. 2 of the second three-volume edition, Griffin 1967). A particularly clear exposition of these established methods is presented in pages 1285–1290 inclusive, 1297–1299 inclusive and page 1305 of "Survey of Applicable Mathematics" ed. K. Rektorys (Iliffe 1969).

In principle, the sum of the squares of the errors is written $$Q = \sum_{j=1}^{n} (e_j)^2 = \sum_{j=1}^{n} (X_{j1}a_1 + \ldots X_{j5}a_5 + \theta_0 - \theta_j)^2$$

and $Q$ is minimized when all its partial derivatives $\dfrac{\partial Q}{\partial a_r} a_r$ for $r = 1 \ldots 5$ are 0. Hence the optimum $a_r$ values may be derived by solving the simultaneous equations $$\frac{\partial Q}{\partial a_r} = \sum_{j=1}^{n} 2X_{jr}(X_{j1}a_1 + \ldots X_{j5}a_5 + \theta_0 - \theta_j) = 0$$

These equations can be represented more compactly by the matrix notation $$\bar{X} \cdot (X \cdot A - Y) = 0 \quad \text{Equation 10)}$$

where $X$ represents the matrix $$\begin{bmatrix} X_{11} \cdots X_{15} \\ X_{n1} \cdots X_{n5} \end{bmatrix}$$

$\bar{X}$ is the transpose of the matrix $X$, $A$ is the column vector $$\begin{bmatrix} a_1 \\ a_2 \\ a_3 \\ a_4 \\ a_5 \end{bmatrix}$$

and $Y$ is the column vector $$\begin{bmatrix} \theta_1 - \theta_0 \\ \theta_2 - \theta_0 \\ - \\ - \\ \theta_n - \theta_0 \end{bmatrix}$$

and 0 is the zero vector $$\begin{bmatrix} 0 \\ 0 \\ 0 \\ 0 \\ 0 \end{bmatrix}$$

The solution of equation 10 is $$A = (\bar{X} \cdot X)^{-1} \cdot \bar{X} \cdot Y \quad \text{(Equation 11)}$$

which can be evaluated using the standard rules for the multiplication, transposition and inversion of matrices to give the required values for the set of constants $a_1$ to $a_5$ inclusive. The constants $b_1$ to $b_5$ can be similarly calculated using the longitude increment values from column 2 of the table. In fact, if $B$ represents the vector $$\begin{bmatrix} b_1 \\ b_2 \\ b_3 \\ b_4 \\ b_5 \end{bmatrix}$$

and $z$ represents the vector $$\begin{bmatrix} \theta_1 - \theta_0 \\ \theta_2 - \theta_0 \\ \cdot \\ \cdot \\ \theta_n - \theta_0 \end{bmatrix}$$

the solution is $$B = (\bar{X} \cdot X)^{-1} \cdot \bar{X} \cdot Z \quad \text{Equation 12)}$$

The approximation may in some cases be made more accurate by including a constant term $a_o$ on the right-hand side of equation 1. If this is done, $a_o$ must be added on the left-hand side of each of the equations of the set beginning with equation 9. The reference point should then be considered as one of the chosen locations, and may conveniently be called location 0. A row of the table for the reference point would contain only zeros, leading to an extra equation which becomes simply $a_o = e_o$, indicating that in any acceptable approximation according to this modified form of equation 1, the term $a_o$ will be very small. The errors should be summed from $j=0$ to $n$. This treatment will again lead to the equation 10 and its solution equation 11 if the symbols used are redefined as follows:

$$X \equiv \begin{bmatrix} 1 & 0 & 0 & 0 & 0 & 0 \\ 1 & X_{11} & X_{12} & X_{13} & X_{14} & X_{15} \\ \cdot & & & & & \\ \cdot & & & & & \\ \cdot & & & & & \\ 1 & X_{n1} & \cdots\cdots\cdots & X_{n5} \end{bmatrix}, A \equiv \begin{bmatrix} a_0 \\ a_1 \\ a_2 \\ a_3 \\ a_4 \\ a_5 \end{bmatrix}$$

$$Y \equiv \begin{bmatrix} 0 \\ \theta_1 - \theta_0 \\ \cdot \\ \cdot \\ \theta_n - \theta_0 \end{bmatrix} \text{ and } 0 = \begin{bmatrix} 0 \\ 0 \\ 0 \\ 0 \\ 0 \\ 0 \end{bmatrix}$$

A similar modification may be made including a term $b_o$ on the right-hand side of equation 2.

When a set of constants has been found, it is desirable to check the accuracy of the approximation using them by calculating the latitudes and longitudes of the chosen locations according to the approximation (that is to say by substituting the calculated constants and the tabulated system coordinate increments in equations 1 and 2), comparing each calculated latitude and longitude with the latitude and longitude originally specified for the same chosen location, and calculating the distance error resulting from the approximation. If any of the distance errors are unacceptable, the boundaries of the region should be revised or new approximations found for smaller regions.

It is desirable, as hereinbefore suggested, that the calculation of suitable sets of constants should be done by a computer. The best method now known for this calculation is a computer program written in Mercury Autocode, comprising the following instructions:

TITLE

LEAST SQUARES INVERSE CONIC OMEGA FIT. GJL:22.5.68

ROUTINE1

S=1(1)2

U2=ψTAN(XS)

U3=ψTAN(V1)

I=2(1)3

UI=0.9966476277U1

ΠI=1+UIUI

ΠI=ψSQRT(ΠI)

ΠI=1/ΠI

REPEAT

Π4=U2Π2

Π5=U3Π3

C1=Π4Π5

D1=Π2Π3

Z1=W1−YS

Z1=ψMOD(Z1)

Z2=Z1

N=0

1) $Z3=\psi SIN(Z2)$ $Z4=\psi COS(Z2)$ $Z5=C1+D1Z4$ $Z6=1-Z5Z5$ $Z6=\psi SQRT(Z6)$ $Z8=\psi ARCTAN(Z5,Z6)$ $A2=D1Z3/Z6$ $B2=A2A2$

JUMP2,N=1

$C2=Z5-B2Z5$ $C2=C2/4.986579272$ $D2=-0.401076547C1$ $E2=-0.799461726C1$ $F2=3.986579272C2$ $G2=Z8Z8/Z6$ $\Pi 10=B2+238.2758765$ $\Pi 11=C2+D2$ $\Pi 12=E2+F2$ $\Pi 13=Z8\Pi 10+Z6\Pi 11+G2\Pi 12$ $\Pi 13=\Pi 13A2/71136.5758$ $Z2=Z2+\Pi 13$ $N=1$

JUMP1

2) $Z9=1-B2$ $Z10=2C1/Z9$ $Z10=Z10-Z5$ $Z11=2Z10Z10-1$ $Z12=Z9Z9$ $Z13=2Z5Z6$ $A0=1+0.0016846525Z9-0.0000021285Z12$ $B0=0.0016846525Z9-0.0000028381Z12$ $C0=0.0000003548Z12$ $\Pi 14=A0Z8+B0Z6Z10-C0Z13Z11$ $HS=6356.788\Pi 14$

REPEAT $G=H2-H1$ $G=AG+900$

RETURN

\*\*

CHAPTER1

$\Pi \rightarrow 16$ $Z \rightarrow 14$ $A \rightarrow 7$ $B \rightarrow 4$ $C \rightarrow 163$ $D \rightarrow 2$ $U \rightarrow 4$ $V \rightarrow 1$ $W \rightarrow 1$ $X \rightarrow 20$ $Y \rightarrow 20$ $E \rightarrow 2$ $F \rightarrow 206$ $G \rightarrow 2$ $H \rightarrow 2$

```
1)K'=11
K=11
A'=9730
J=0(1)1
CJ=CK
PRINT(CK)4,3
ψ7(A')CK,1
Q=1(1)P
―――――――
CK'=CK'-CJ
K'=K'+1
REPEAT
K=K+P
A'=A'+1
REPEAT
NEWLINE
K=11+P'
K'=10+3P
Q=K(1)K'
CQ=1
REPEAT
ψ7(W')CK,P
L=11
J=1(1)2
Q=K(1)K'
CQ=CL
L=L+1
REPEAT
ψ7(W'+JP)CK,P
```

```
REPEAT
L=11
Q=K(1)K'
L'=L+P
CQ=CLCL'
L=L+1
REPEAT
ψ7(W'+3P)CK,P
―――――――
L=11
J=4(1)5
Q=K(1)K'
CQ=CLCL
L=L+1
REPEAT
ψ7(W'+JP)CK,P
REPEAT
V'=4P'+12
V'=ψ27(W',W',6,6,U')
0=ψ26(W',1000,6,2,U')
0=ψ28(V',6,2)
ψ8(0,6,2,0,6)
2000=ψ16(W',6,U')
3000=ψ26(2000,0,U',2,6)
4000=ψ12(3000,1000,W')
ψ6(4000)C11,P'
Q=2(2)P'
X=ψCOS(F(Q+1))
Y=C(Q+9)
```

```
Z=XC (Q+10)

D=ψSQRT(YY+ZZ)

Z'=ψARCTAN(Z,Y)

Z'=Z'/U

PRINT(60D)2,3

JUMP2,Z'≥90

Z'=90-Z'

JUMP 3
─────────────────
2)Z'=450-Z'

3)PRINT(Z')3,0

NEWLINE

REPEAT

CHANNEL 2P

ψ6(9728)F1,4

ψ6(0)F5,12

F1=F1+F5

F2=F2+F6

NEWLINE

I=1(1)2

PRINT(FI)2,4

NEWLINE

REPEAT

I=7(1)16

PRINT(FI)1,7

NEWLINE

REPEAT

I=3(1)4

PRINT(FI)4,4

NEWLINE

REPEAT

J=0(1)11

PUNCH(0)

REPEAT

NEWLINE

J=0(1)5

PUNCH(31)

REPEAT

NEWLINE

J=1(1)40

PUNCH(0)

REPEAT

CHANNEL 1P

ACROSS10/0

CLOSE
─────────────────
CHAPTER0

VARIABLES1

U=π/180

READ(J)

I=1(1)J

PRINT(I)2,0

READ(X)

PRINT(X)3,5

X(I+2)=UX

READ(X)

PRINT(X)3,5
```

```
NEWLINE                     READ(X)

Y(I+2)=UX                   PRINT(X)2,5

REPEAT                      READ(Y)

READ(C)                     PRINT(Y)2,5

S=3(2)9                     F5=F3

READ(R)                     F13=F3

PRINT(R)1,0                 F7=F3+X

CS=X(R+2)                   F9=F7

C(S+1)=Y(R+2)               F11=F7

REPEAT                      F15=F3-X

NEWLINE                     F17=F15

PRINT(C)6,1                 F19=F15

READ(F)                     F10=F4

PRINT(F)5,0

READ(V)                     F18=F4

PRINT(V)1,6                 F6=F4+Y

NEWLINE                     F8=F6

A=VC                        F20=F6

A=F/A                       F14=F4-Y

10)READ(P)                  F12=F14

JUMP1,P≥6                   F16=F14

A≃9728                      P=9

K=3(1)4                     P'=2P

READ(FK)                    U'≃P

PRINT(FK)2,5                JUMP2

ψ7(A')FK,1                  1)P'=2P

A'≃ A'+1                    U'≃P

REPEAT                      Q=2(2)P'
```

```
READ(F(Q+1))

PRINT(F(Q+1))2,5

READ(F(Q+2))

PRINT(F(Q+2))2,5

NEWLINE

REPEAT

ψ7(9728)F3,2

2)NEWLINE

W'≃P'

X=F3

Y=F4

Q=2(2)P'

F(Q+103)=F(Q+1)-X

F(Q+104)=F(Q+2)-Y

F(Q+1)=UF(Q+1)

F(Q+2)=UF(Q+2)

K=K+2

REPEAT

ψ7(0)F105,P'

1000=ψ15(0,W')

K=11

J=3(4)7

X1=CJ

Y1=C(J+1)

X2=C(J+2)

Y2=C(J+3)

Q=2(2)P'

V1=F(Q+1)

W1=F(Q+2)

JUMPDOWN(R1)

CK=1800-G

K=K+1

REPEAT

REPEAT

ACROSS1/1

CLOSE
```

The input data for this program should be presented as indicated by the following typical example:

| | | |
|---|---|---|
| 4 | | (= number of transmitters) |
| 66.420833333 | 13.152777778 | (= lat. and long. of first transmitter) |
| 10.701722222 | −61.638972222 | (= lat. and long. of second transmitter) |
| 21.405741667 | −157.82993056 | (= lat. and long. of third transmitter) |
| 43.44470 | −75.086555556 | (= lat. and long. of fourth transmitter) |
| 299792.5 | | (= velocity of light) |
| ***T | | |
| 1 2 | 1 4 | (transmitter pairs to be considered) |
| 10200 | | (signal frequency to be used, Hz.) |
| | 1.00324 | (= velocity ratio = velocity of propagation round the earth, divided by the velocity of light) |
| 15 | | (= number of chosen locations) |
| 50 | 0.5 | (= latitude and longitude of location 1) |
| 51.3 | −1.0 | (= latitude and longitude of location 2) |
| 51.3 | −0.5 | (= latitude and longitude of location 3) |
| et cetera | et cetera | |

The program takes the first location of the list (in this example it is lat. 50° long. 0.5°) as the reference point, and gives a printout of details as follows:

| | | |
|---|---|---|
| 50.00000 | 0.50000 | (= lat. and long. of location 1) |
| 51.30000 | −1.00000 | (= lat. and long. of location 2) |
| etcetera | | etcetera |
| 725.043 | 952.570 | (= Omega system coordinates for the reference point, location 1) |
| 1.907842& | −4 | (that is, $a_q=1.907842 \times 10^{-4}$) |
| −1.448631& | −4 | (that is, $b_q=-1.448631 \times 10^{-4}$) |
| 1.706204& | −2 | (that is, $a_1=1.706204 \times 10^{-2}$) |
| −3.529820& | −1 | (that is, $b_r=-3.529820 \times 10^{-1}$) |
| et cetera | | et cetera |
| 0.013 | 334 | (polar-type coordinates of the error in the approximation at location 1 — distance given in nautical miles, angle in degrees clockwise from North) |
| 0.016 | 163 | (coordinates of the error at location 2) |
| et cetera | | et cetera. |

In the above program, letter O is not used as a store reference and occurs only in command words; where it occurs alone or in a number, 0 represents a zero. Details of the Mercury Autocode language have been published for instance in RAE Technical Note Math 92, available from the Royal Aircraft Establishment, Farmborough, Hampshire, England. Mercury Autocode compilers for the Mercury, Atlas and ICL 1900 series computers are available to the public from International Computing Laboratories, software Distribution Branch, 30/31 Friar Street, Reading, Berkshire, England. They are known as EMA compilers and are available in magnetic tape form (XMAM compiler), disc form (XMAE compiler) or in paper tape form (XMAP compiler).

I claim:
1. Navigational apparatus comprising:
   measuring means for providing electrical representations of at least two coordinates $W_{xy}$ and $W_{pq}$ representing the position of the measuring means in a hyperbolic navigation system,
   data storage means for storing representations of sets of previously calculated numerical constants, each particular set being applicable to positions within an associated region within the range of the hyperbolic navigation system so that two predetermined algebraic polynomial functions $\theta$, $\phi$ of the coordinates $Wxy$, $Wpg$ and the constants of the set, of the second degree with respect to the coordinates $Wxy$, $Wpq$ but substantially linearly dependent on the constants and not involving any trigonometric functions of the coordinates $Wxy$, $Wpq$, will have numerical values approximately equal to the latitude and the longitude respectively of the position represented by the coordinates $Wxy$, $Wpg$ provided that this position lies within the region associated with the set of constants used, electronic selection means for selecting from the data storage means the representations of a set of constants ($a_1 \ldots a_n, b_1 \ldots b_n$) applicable to a region embracing the position of the measuring means, and computing means responsive to the representations of $Wxy$, $Wpq$ provided by the measuring means and responsive to the representations of the constants $a_1 \ldots a_n, b_1 \ldots b_n$ selected from the data storage means for computing the numerical values of the algebraic polynomial functions $\theta(a_1 \ldots a_n, Wxy, Wpg)$ and $\phi(b_1 \ldots b_n, Wxy, Wpq)$ which are of the second degree with respect to the coordinates $Wxy$, and $Wpq$ but are substantially linearly dependent on the constants $a_1 \ldots a_n$ and $b_1 \ldots b_n$ respectively and do not involve any trigonometric functions of the coordinates $Wxy$, $Wpq$, so that the said numerical values will be approximately equal to the latitude and the longitude respectively of the position represented by the coordinates $Wxy$, $Wpq$ provided that this position lies within the region associated with the set of constants used.

2. Navigational apparatus as claimed in claim 1, wherein the functions $\theta$ and $\phi$ are polynomials of the second degree with respect to increments $Dxy$, $Dpq$ of the hyperbolic system coordinates, and the computing means is connected accordingly for calculating the said polynomials.

3. Navigational apparatus as claimed in claim 1, wherein said electronic selection means comprises logical circuits connected to respond to the representations of the coordinates $Wxy$ and $Wpq$ provided by the measuring means, and switching circuit means, controlled by the logical circuits, for applying to the computer means signals from the data-storage means which represent a set of the said constants applicable to a region which includes the location represented by the said coordinates $Wxy$ and $Wpq$.

4. Navigational apparatus as claimed in claim 1 wherein the computer means comprises display means for indicating the numerical values of the functions $\theta(a_1 \ldots a_n, Wxy, Wpq)$ and $\phi(b_1 \ldots b_n, Wxy, Wpq)$ computed by the computing means.

5. Navigational apparatus as claimed in claim 1 and wherein said electronic selection means comprises logical circuits connected to respond to latitude-indicating and longitude-indicating outputs of the computer means, and switching circuit means, controlled by the logical circuits, for applying to the computer means signals from the data-storage means which represent a set of the said constants applicable to a region including the location indicated by the said latitude-indicating and longitude-indicating outputs.

6. Navigational apparatus comprising:

measuring means for providing electrical representations of at least two coordinates $Wxy$ and $Wpq$ representing the position of the measuring means in a hyperbolic navigation system, data storage means for storing representations of sets of previously calculated numerical constants, each particular set being applicable to positions within an associated region within the range of the hyperbolic navigation system so that two predetermined algebraic polynomial functions, $\theta$, $\phi$ of the coordinates $Wxy$, $Wpq$ and the constants of the set, of the second degree with respect to the coordinates $Wxy$, $Wpq$ but substantially linearly dependent on the constants and not involving any trigonometric functions of the coordinates $Wxy$, $Wpq$, will have numerical values approximately equal to the latitude and the longitude respectively of the position represented by the coordinates $Wxy$, $Wpq$ provided that this position lies within the region associated with the set of constants used.

regional data input means for transmitting from the said data storage means the representations of a set of the said numerical constants, and computing means responsive to the representations of $Wxy$, $Wpq$ provided by the measuring means and to the representations of the set of constants transmitted by the regional data input means for computing the numerical values of the two predetermined algebraic polynomial functions $\theta(a_1 \ldots an, Wxy, Wpq)$ and $\phi(b_1 \ldots b_n, Wxy, Wpq)$ which are of the second degree with respect to the two coordinates $Wxy$ and $Wpq$ but are substantially linearly dependent on the constants $a_1 \ldots a_n$ and $b_1 \ldots b_n$ respectively and do not involve any trigonometric functions of the coordinates $Wxy$, $Wpq$, so that the said numerical values will be approximately equal to the latitude and the longitude respectively of the position represented by the coordinates $Wxy$, $Wpq$ provided that this position lies within the region associated with the set of constants used.

7. Navigational apparatus as claimed in claim 6 wherein said regional data input means comprises a tape reader or card reader device.

8. Navigational apparatus as claimed in claim 6 wherein said regional data input means comprises a fixed data store having manually operable selection switches.

9. Navigational apparatus as claimed in claim 6, wherein the functions $\theta$ and $\phi$ are polynomials of the second degree with respect to increments $Dxy$, $Dpq$ of the hyperbolic system coordinates, the computing means being operative to calculate said polynomials.

10. Navigational apparatus as claimed in claim 6, wherein the computing means includes display means for indicating the numerical values of the functions $\theta$ and $\phi$ computed by the computing means.

* * * * *